Aug. 31, 1948.  J. J. LOW  2,448,224
SPRING SUSPENSION FOR VEHICLES
Filed March 20, 1946  3 Sheets-Sheet 1

INVENTOR
John J. Low,
BY Edwin D. Jones.
ATTORNEY

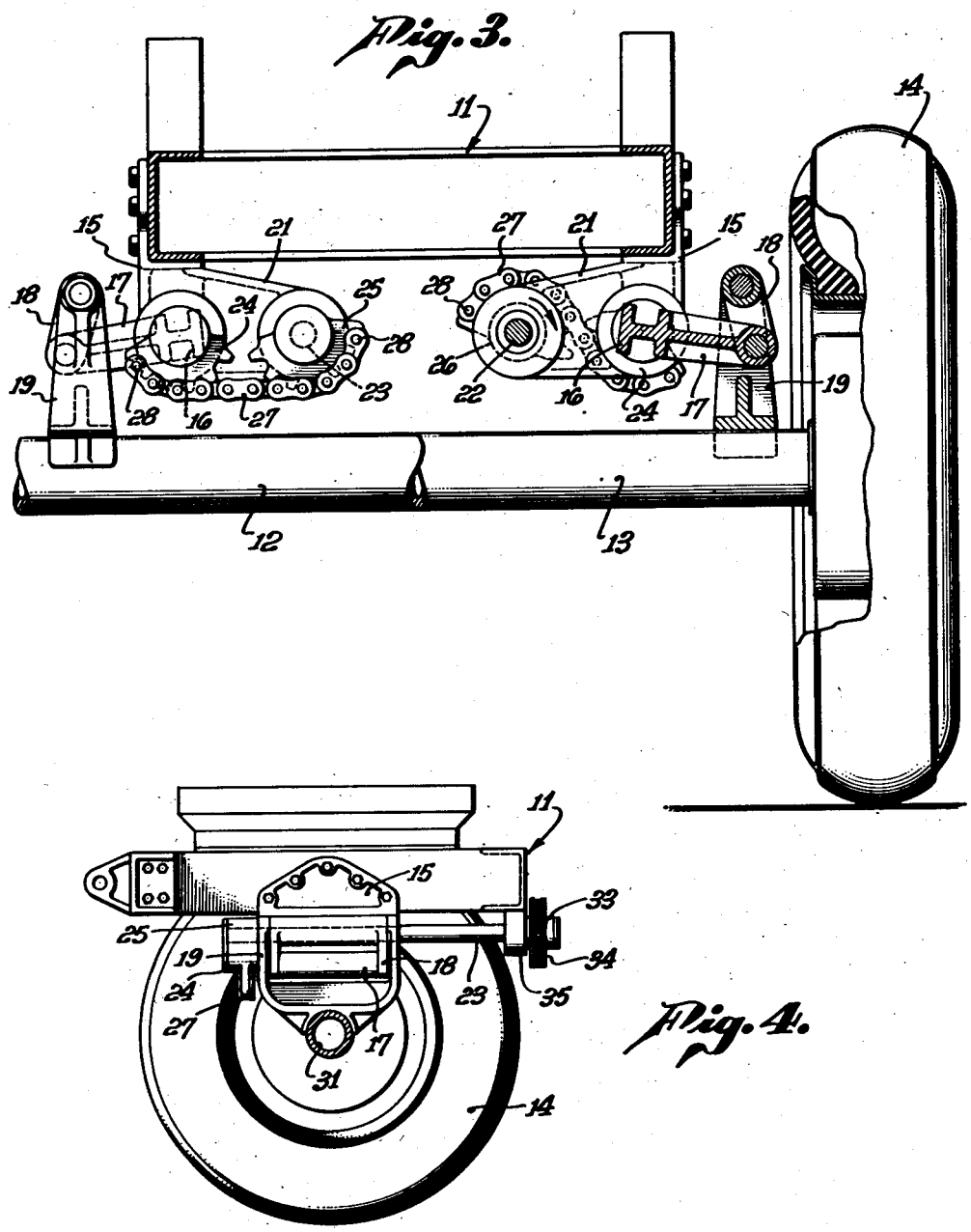

Aug. 31, 1948. J. J. LOW 2,448,224
SPRING SUSPENSION FOR VEHICLES
Filed March 20, 1946 3 Sheets-Sheet 3

INVENTOR
JOHN J. LOW,
BY Edwin D. Jones.
ATTORNEY

Patented Aug. 31, 1948

2,448,224

UNITED STATES PATENT OFFICE 2,448,224

SPRING SUSPENSION FOR VEHICLES

John J. Low, Los Angeles, Calif.

Application March 20, 1946, Serial No. 655,650

13 Claims. (Cl. 280—104.5)

This invention relates to spring suspensions for vehicles and particularly pertains to suspensions in which a torsion spring provides a resilient connection between the frame of a vehicle and the wheeled underbody thereof, and one of the objects of the invention is to supplement the resiliency of the torsion springs by providing flexible yet positively acting connections between the underbody and the springs.

A further object of the invention is to apply the said flexible connections to the torsion springs in such manner as to obtain reversed torsional stresses upon the two ends of a spring, without the use of differential or reversing mechanism heretofore used in such suspensions.

Another object of the invention is to enhance the freedom of action of a torsion spring suspension of a vehicle, by providing spring mountings which do not directly sustain the weight of the vehicle, and are free of frictional or resistant elements between the ends of the springs, whereby the springs may react to the torsional stresses applied thereto without frictional interference.

Yet another object of the invention is to provide a torsion spring suspension wherein the springs are flexibly connected to the underbody and to each other in a manner to render to each other the mutual support usually provided by multiple axles, whereby the suspension is applicable to a single axle.

With these and other objects and advantages in view, which will appear hereinafter, I have embodied my invention in preferred and modified forms set forth by way of example in the following description and in the accompanying drawings, in which:

Fig. 3 is a partial section and elevation on the line 3—3 of Fig. 1, illustrating the suspension means employed at the two ends of the torsion springs.

Fig. 4 is a view similar to Fig. 2, illustrating the application of the invention to a single axle.

Figure 1:
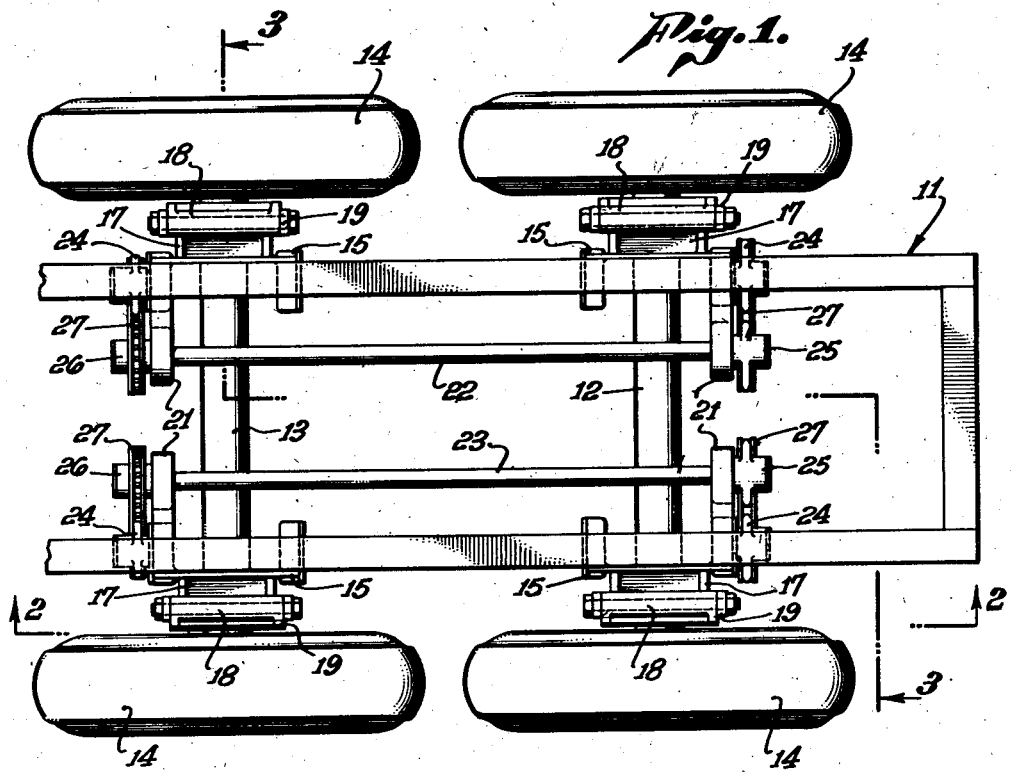
Fig. 1 is a plan view of a vehicular underbody having two axles and of a form of spring suspension embodying my invention and applicable thereto.
Figure 2:
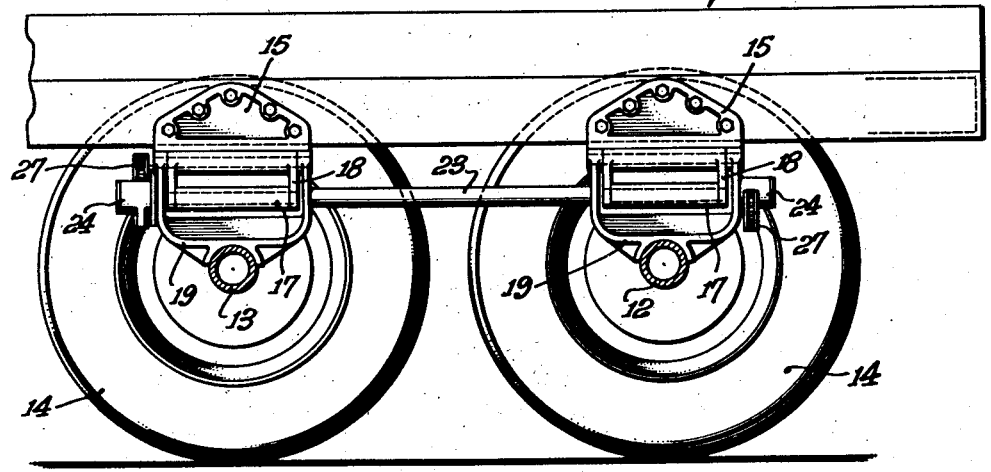
Fig. 2 is a vertical section on the lines 2—2 of Fig. 1.

Having particular reference to Figs. 1 to 3, 11 indicates the chassis frame of a vehicle supported upon axles 12 and 13 provided with wheels 14, the assembly of wheels and axles being generally termed the underbody of the vehicle. In the vertical plane of each of the axles 12 and 13, the frame 11 is provided on each side with brackets 15 in which are journalled the hubs 16 of levers 17, the latter extending outwardly from their hubs and being connected to the axles 12 and 13 by suitable linkage, such as the conventional shackles 18 and perches 19, in a manner to translate vertical movement of the frame 11 relative to the underbody into rotary movement of the levers 17 in a vertical plane about their hubs 16.

Brackets 15 are provided with inwardly extending arms 21 in which are journalled torsion springs 22 and 23, one of said springs being carried on each side of the frame 11 longitudinally thereof and parallel to the lever hubs 16 supported by the same brackets. The springs 22 and 23 are preferably shafts of fine quality steel having great resiliency and ability to absorb torsional forces applied thereto. Each of the levers 17 has mounted upon its hub 16 so as to rotate therewith a sprocket 24, which may be segmental only. The springs 22 and 23 each carry at their one ends similar sprockets 25 and at their other ends similar sprockets 26, alined with the sprockets 24 in associated pairs and rotatable with the springs. The sprockets 25 and 26 may also be segmental only, in which case the sprocket segments 25 at one end of the springs are diametrically reversed from the sprocket segments 26 at the other end of the springs. The sprockets 24 are connected to their associated sprockets 25 and 26 by chains 27, the ends of which are held to the sprockets by pivot pins 28.

The weight of the vehicle body is carried by the brackets 15, levers 17, shackles 18, and perches 19, and tends constantly to push the hubs 16 of the levers downwardly, thereby pivoting the levers in the shackles 18 and urging the hubs to turn the sprockets 24, mounted thereon. As the levers 17 extend outwardly in opposite directions on the two sides of the vehicle, the sprockets 24 on the respective sides will also rotate in opposite directions, the rotation due to an increase of load being on each side such as to move the lower portion of the sprockets outwardly. The rotation of the sprockets 24 is resisted by the torsion springs 22 and 23, acting through the sprockets 25 and 26 and the chains 27. The chains 27 connect the sprockets 25 at the one ends of the springs 22 and 23 to their associated sprockets 24 so that the sprockets 25 turn in the same directions as their associated sprockets, and connect the sprockets 26 at the other ends of the springs to their associated sprockets 24 so that the associated sprockets 26 and 24 turn in opposite directions. Therefore, when an increase of load, or road conditions, causes the frame 11 to approach the axles 12 and 13, the opposite ends of each of the springs 22 and 23 will be turned in opposite directions, setting up torsional stress in the springs resistant to the relative movement of the frame and axles. A decrease in load, or a road condition causing the frame to rise relatively to the axles will cause the sprockets 24 to rotate so as to release part of the chains 27, and this release will be translated as reduced tension through the chains to the springs 22 and 23, with reduction of torsional stress in the latter. Road irregularities of short duration which affect first one axle and then the other will transmit torsion to the end of the springs adjacent the affected axle, with the other end of the springs temporarily anchored to the unaffected axle and resistant to such torsion.

Figure 5:
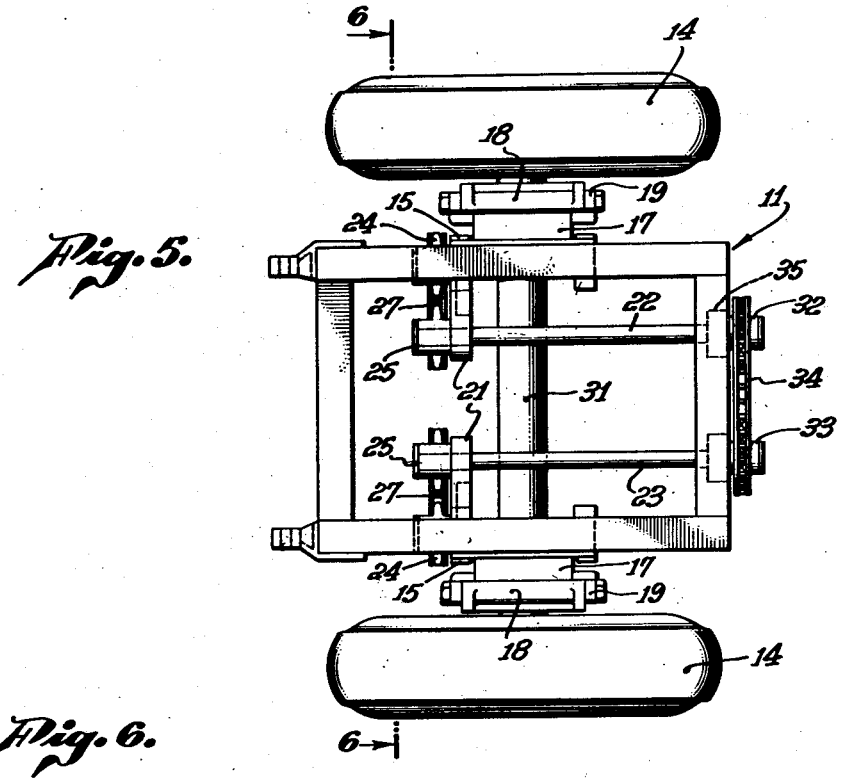
Fig. 5 is a plan view of the embodiment shown in Fig. 4.
Figure 6:
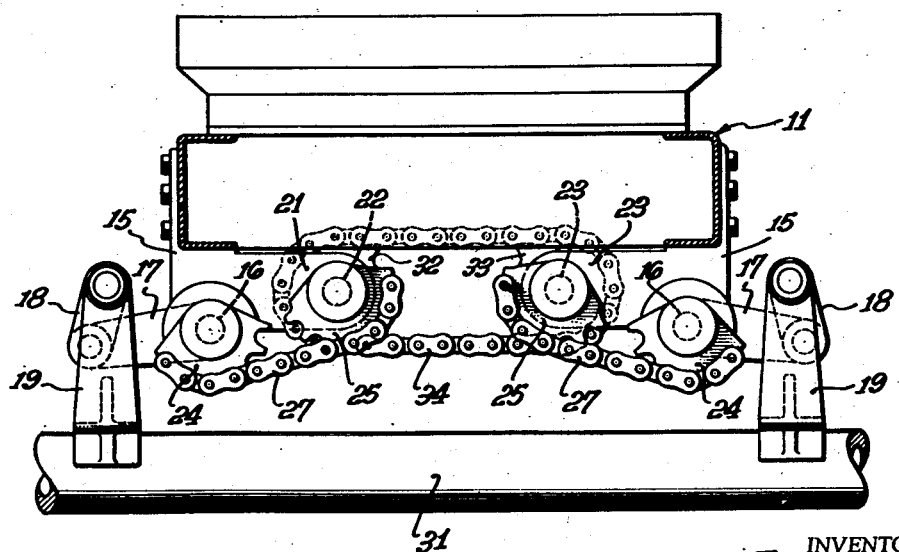
Fig. 6 is an end elevation and partial sectional view taken on the line 6—6 of Fig. 5, with parts shown in phantom to illustrate the spring connections at both ends of the springs.

In Figs. 4 to 6 I have illustrated a modified form of my invention in which it is applied to a single axle. The vehicle frame 11 is supported upon a single axle 31 by brackets 15 alined above the axle and connected therewith by levers 17, shackles 18, and perches 19. Hubs 16 of the levers 17 are provided with sprockets 24 connected by chains 27 to sprockets 25 on the alined ends of torsion springs 22 and 23. Full sprockets 32 and 33 are provided at the other end of the springs 22 and 23, and are connected by a chain 34, the ends of the springs being journalled in journals 35. In this form of my invention, the sprockets 25 and the torsion springs 22 and 23 are given torsional stress by the convergence of the frame 11 and axle 31, the sprockets 32 and 33 being then anchored in place by the chain 34. A road irregularity affecting both ends of the axle 31 simultaneously will therefore cause both springs 22 and 23 to rotate at their ends adjacent to the axle, with their other ends held resistantly to said rotation. A road irregularity affecting only one of the wheels will transmit torsional movement through the spring connected to that end of the axle and thence through the chain 34 to the other spring, the anchorage providing resistance to the torsional movement being in this case at the sprocket 25 at the unaffected end of the axle.

In the single axle embodiment of the invention as well as in the double axle embodiment, the weight of the body of the vehicle is carried by the levers 17, and no weight is carried by the torsion springs 22 and 23 which are therefore free to react to torsional stresses without the interference which such weight would impose. The chains 27 and the chain 34 cushion the stresses imposed upon them, and by their flexibility are able to become slack when not under tension, thus permitting complete freedom of action of the elements to which they are attached. By their connection to oppositely turned segments on the sprockets 25 and 26, the chains 27 effect the double twisting of the springs 22 and 23 without the use of differential mechanism, while still permitting outward extension of all the levers 17 to perches disposed near the ends of the axles, which is a recognized advantage in all spring suspensions.

Numerous modifications may be made in the application of the principles of the present invention and I wish it understood that the scope of the appended claims is not to be considered as limited to the herein-delineated forms of apparatus.

I claim:

1. A spring suspension for a vehicle having an axle and a frame at least partly supported by said axle, comprising: torsion springs carried by said frame longitudinally of said vehicle and rotatable upon their longitudinal axes; levers carried by said frame pivotable upon axes parallel to the axes of said torsion springs; perches on said axle; shackles connecting said perches with the free ends of said levers; flexible means so connecting said levers to one end of said springs as to be alternately tensed and relaxed in response to movements of said frame in opposite directions relative to said axle, for producing torsional movement in said springs when tensed; and means flexibly connected with the other end of said springs resistant to said torsional movement.

2. A spring suspension for a vehicle having an axle and a frame at least partly supported by said axle, comprising: torsion springs carried by said frame longitudinally of said vehicle and rotatable upon their longitudinal axes; levers carried by said frame pivotable upon axes parallel to the axes of said torsion springs; perches on said axle; shackles connecting said perches with the free ends of said levers; toothed means on said levers rotatable therewith; additional toothed means on the ends of said torsion springs rotatable therewith, said means at one end of said torsion springs being operably connected with said first mentioned toothed means to impart torsional movement to said torsion springs; and means connected with said additional toothed means at the other end of said torsion springs resistant to said torsional movement.

3. A spring suspension for a vehicle having an axle and a frame at least partly supported by said axle, comprising: torsion springs carried by said frame longitudinally of said vehicle and rotatable upon their longitudinal axes; levers carried by said frame pivotable upon axes parallel to the axes of said torsion springs; perches on said axle; shackles connecting said perches with the free ends of said levers; chain-and-sprocket means connecting said torsion springs and said levers and operable by the movement of said levers to cause torsional movement of said torsion springs; additional sprockets carried by said torsion springs spaced from said chain-and-sprocket means; and chain means engaging said additional sprockets and so anchored as to resist said torsional movement.

4. A spring suspension for a vehicle having an axle and a frame at least partly supported by said axle, comprising: torsion springs carried by said frame longitudinally of said vehicle and rotatable upon their longitudinal axes; levers carried by said frame pivotable upon axes parallel to the axes of said torsion springs; perches on said axle, shackles connecting said perches with the free ends of said levers; chain-and-sprocket means connecting said torsion springs and said levers and operable by the uniform movement of said levers to cause torsion movement of said torsion springs; additional chain-and-sprocket means carried by said torsion springs distant from said first chain-and-sprocket means and resistant to said torsional movement when the movement of said levers is uniform and permissive to the torsional movement of one of said torsion springs when the movement of said levers is in diverse directions.

5. A spring suspension for suspending the frame of a vehicle upon the wheeled underbody thereof, comprising: a bracket on each side of said frame; levers having their one ends pivotally supported in said brackets for pivotal movement of said levers in substantially vertical planes; perches on said underbody; shackles pivotally connecting said perches and the other ends of said levers; sprockets on the said one ends of said levers; a torsion spring carried longitudinally by said frame adjacent each side thereof and spaced from said levers; additional sprockets on the ends of said torsion springs; chains so connecting said first sprockets to the sprockets on the one ends of said torsion springs as to cause torsional movement of said torsion springs in opposite directions when said levers are moved in like vertical directions; and chain means so engaging the sprockets on the other ends of said torsion springs as to resist said oppositely directed torsional movements while leaving said torsion springs free to rotate in like directions when said levers are moved in diverse vertical directions.

6. A spring suspension for suspending the frame of a vehicle upon the wheeled underbody thereof, comprising: a bracket on each side of said frame; a lever supported by each of said brackets for pivotal movement; perches on said underbody; shackles pivotally connecting said perches; sprockets carried coaxially by said levers and rotatable therewith; torsion springs carried longitudinally by said frame adjacent each side thereof and spaced from said levers; and each having one end alined with said sprockets; additional sprockets on the ends of said torsion springs; chains so connecting said first sprockets to the sprockets on the one ends of said torsion springs as to cause torsional movement of said torsion springs in opposite directions when said levers are moved in like vertical directions; a chain means engaging the sprockets on the other ends of said torsion springs so as to resist said oppositely directed torsional movements while leaving said torsion springs free to rotate in like directions when said levers are moved in diverse vertical directions.

7. A spring suspension for suspending the frame of a vehicle upon the wheeled underbody thereof, comprising: a torsion spring carried longitudinally by said frame adjacent each side thereof; a lever supported by said frame adjacent one end of each of said torsion springs and pivotable on an axis parallel to said torsion spring; linkage means connecting said levers with said underbody for actuating said levers by translation of vertical movement of said frame relative to said underbody; aligned sprockets carried by said torsion springs and by said levers so as to be axially rotatable therewith in associated pairs; chains connecting said associated pairs of sprockets arranged to impart opposite torsional movements to said torsion springs when said levers are actuated in like vertical directions; additional sprockets on the ends of said torsion springs distant from said levers; and a chain connecting said additional sprockets and resistant to opposite rotational movements thereof.

8. A spring suspension for suspending the frame of a vehicle upon the wheeled underbody thereof, comprising: a torsion spring carried longitudinally by said frame adjacent each side thereof; a lever supported by said frame adjacent one end of each of said torsion springs and pivotable on an axis parallel to said torsion spring; linkage means connecting said levers with said underbody for actuating said levers by translation of vertical movement of said frame relative to said underbody; alined toothed means carried by said torsion springs and by said levers so as to be axially rotatable therewith and operably connected to impart opposite torsional movements to said torsion springs when said levers are actuated in like vertical directions; and additional toothed means on the ends of said torsion springs distant from said levers operably connected so as to resist opposite rotational movements thereof.

9. A spring suspension for suspending the frame of a vehicle upon the wheeled underbody thereof, comprising: torsion springs carried longitudinally by said frame adjacent each side thereof; levers supported by said frame adjacent the ends of said torsion springs and pivotable on axes parallel to said torsion springs; linkage means connecting said levers with said underbody for actuating said levers by translation of vertical movement of said frame relative to said underbody; aligned sprockets carried by said torsion springs and by said levers so as to be axially rotatable therewith; and chains connecting each spring-carried sprocket to the lever-carried sprockets adjacent thereto, said chains being arranged to impart opposite torsional movements to the opposite ends of said torsion springs when said levers are actuated in like vertical directions.

10. A spring suspension for suspending the frame of a vehicle upon the wheeled underbody thereof, comprising: torsion springs carried longitudinally by said frame adjacent each side thereof; levers supported by said frame adjacent the ends of said torsion springs and pivotable on axes parallel to said torsion springs; linkage means connecting said levers with said underbody for actuating said levers by translation of vertical movement of said frame relative to said underbody; aligned toothed means carried by said torsion springs and by said levers so as to be axially rotatable therewith, and operably connected to impart opposite torsional movements to the opposite ends of said torsion springs when said levers are actuated in like vertical directions.

11. A spring suspension for suspending the frame of a vehicle upon the wheeled underbody thereof, comprising: torsion springs carried longitudinally by said frame adjacent each side thereof; levers supported by said frame adjacent the ends of said torsion springs and pivotable on axes parallel to said torsion springs; linkage means connecting said levers with said underbody for actuating said levers by translation of vertical movement of said frame relative to said underbody; sprockets carried by said torsion springs at each end thereof and by said levers in associated pairs; chains at one end of said torsion springs connecting said associated pairs of sprockets to move them in like directions; and chains at the other end of said torsion springs connecting said associated pairs of sprockets to move them in opposite directions.

12. A spring suspension for suspending the frame of a vehicle upon the wheeled underbody thereof, comprising: torsion springs carried longitudinally by said frame adjacent each side thereof; levers supported by said frame adjacent the ends of said torsion springs and pivotable upon axes parallel to said torsion springs; linkage means connecting said levers with said underbody for actuating said levers by translation of vertical movement of said frame relative to said underbody; alined tractive means carried by said torsion springs at each end thereof and by said levers so as to be rotatable therewith in associated pairs; and flexible means tractively connecting said associated pairs of tractive means so as to impart opposite torsional movements to the opposite ends of said torsion springs when said levers are actuated in like vertical directions.

13. A spring suspension for suspending the frame of a vehicle upon the wheeled underbody thereof, comprising: a torsion spring carried longitudinally by said frame adjacent each side thereof; a lever supported by said frame adjacent one end of each of said torsion springs and pivotable on an axis parallel to said torsion spring; linkage means connecting said levers with said underbody for actuating said levers by translation of vertical movement of said frame relative to said underbody; alined tractive means carried by said torsion springs and by said levers so as to be rotatable therewith; flexible means operably connecting said alined tractive means, for imparting opposite torsional movements to said torsion springs when said levers are actuated in like vertical directions; additional tractive means on the ends of said torsion springs distant from said levers and rotatable thereby; and additional flexible means operably connecting said additional tractive means so as to resist opposite rotational movements thereof.

JOHN J. LOW.

REFERENCES CITED

The following references are of record in the file of this patent:

UNITED STATES PATENTS

| Number | Name | Date |
|---|---|---|
| 1,052,795 | Brophy | Feb. 11, 1913 |
| 1,396,549 | Beatty | Nov. 8, 1921 |
| 1,831,631 | Manns | Nov. 10, 1931 |
| 2,024,199 | Barnes et al. | Dec. 17, 1935 |
| 2,160,862 | Hickman | June 6, 1939 |
| 2,175,516 | Bugatti | Oct. 10, 1939 |
| 2,333,008 | Holmstrom et al. | Oct. 26, 1943 |
| 2,333,650 | Hickman | Nov. 9, 1943 |
| 2,395,183 | Holmstrom et al. | Feb. 19, 1946 |

FOREIGN PATENTS

| Number | Country | Date |
|---|---|---|
| 149,718 | Great Britain | Aug. 26, 1920 |